Oct. 3, 1967  J. G. DROP  3,344,900
CHIP ORIENTING CONTROL CIRCUIT FOR A CHIP
POSITIONING MACHINE
Filed May 27, 1965  12 Sheets-Sheet 7

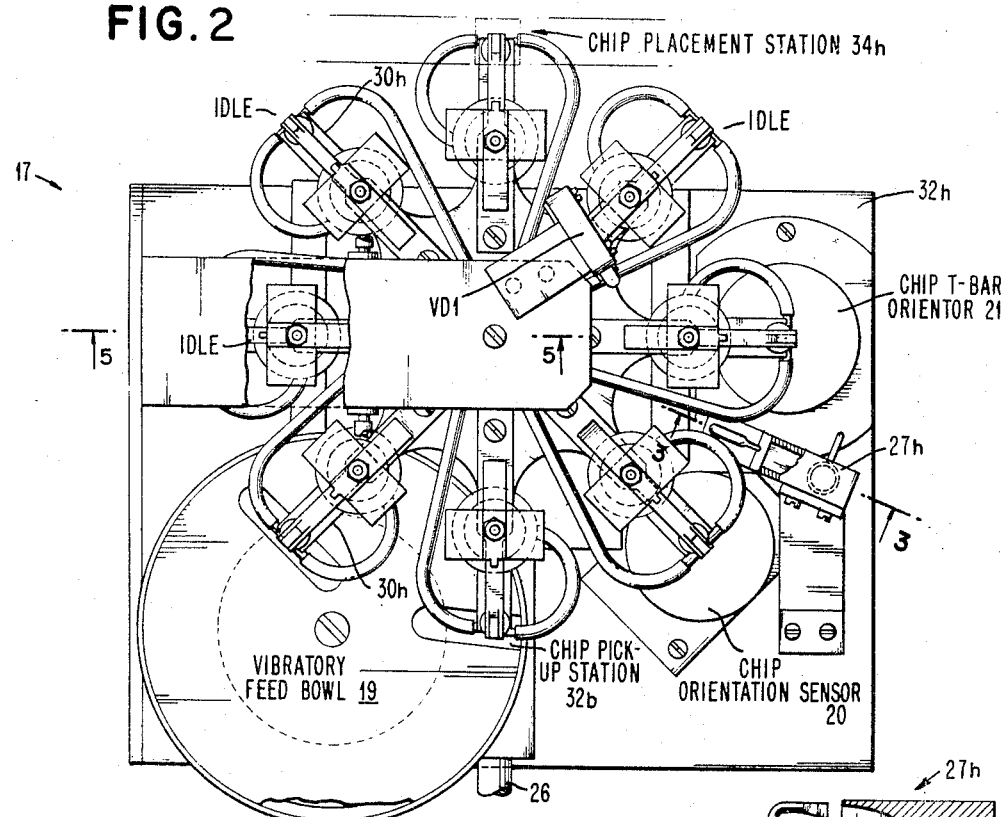
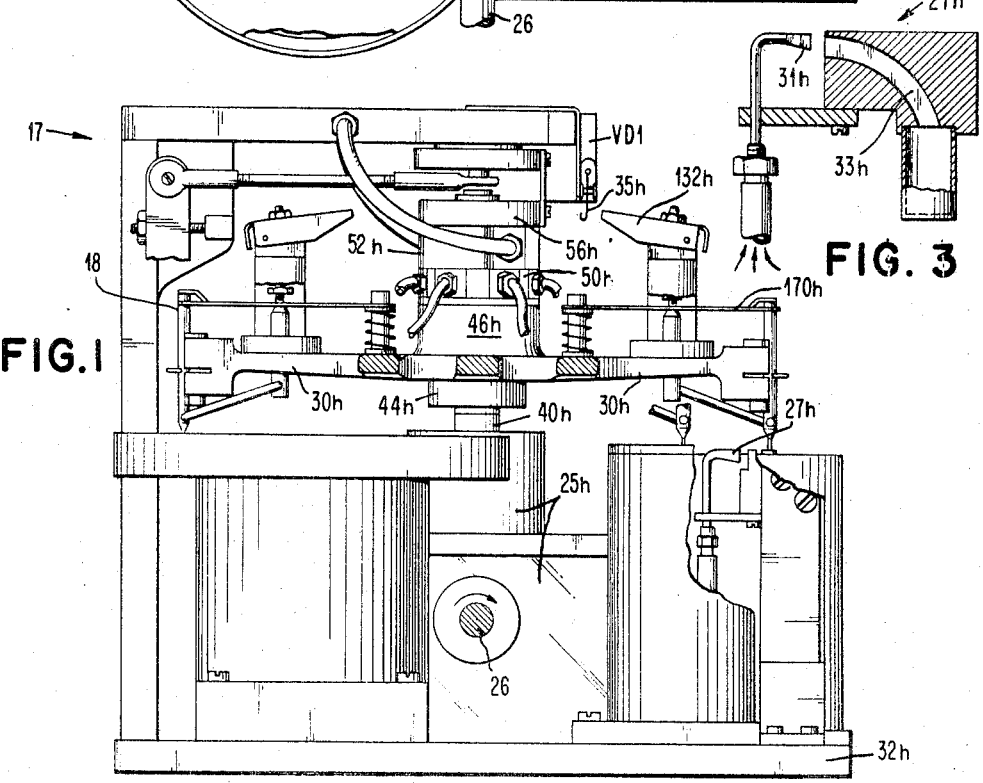

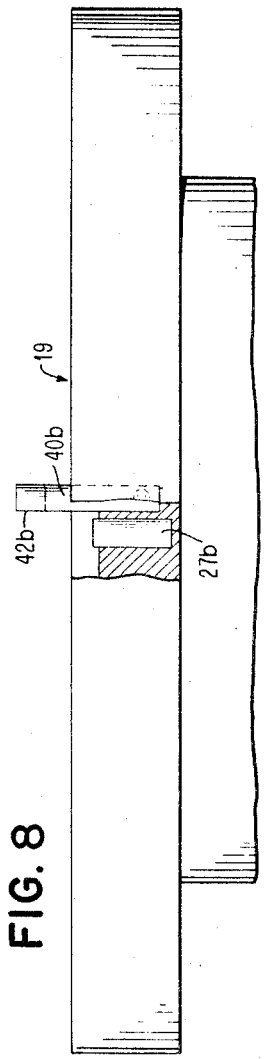

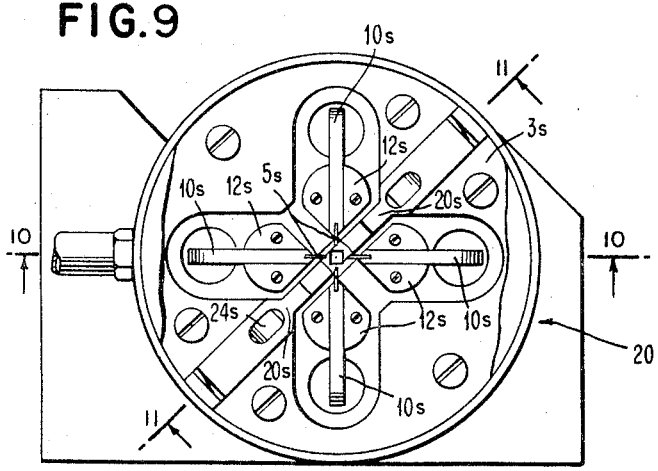
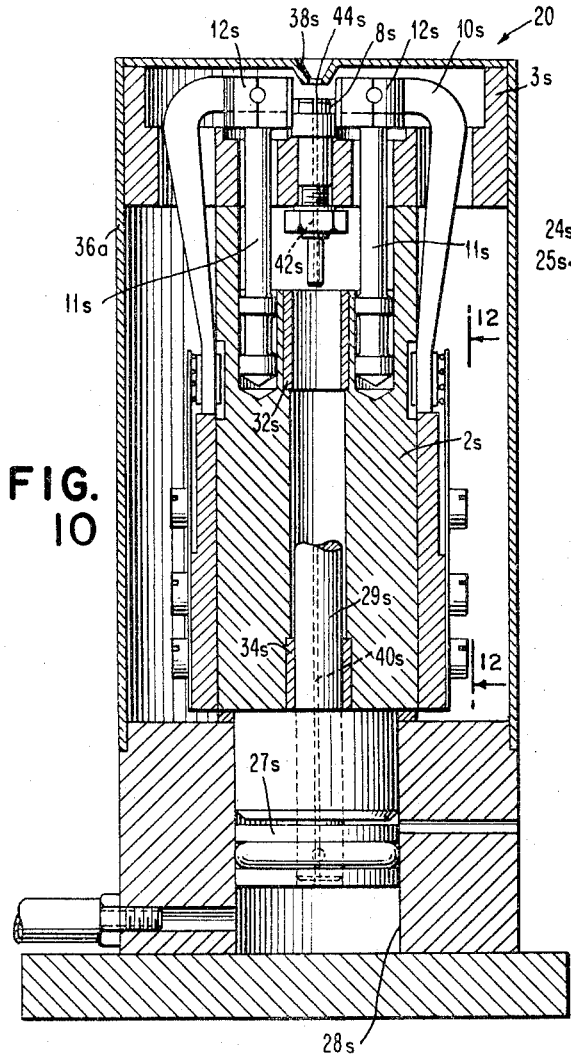
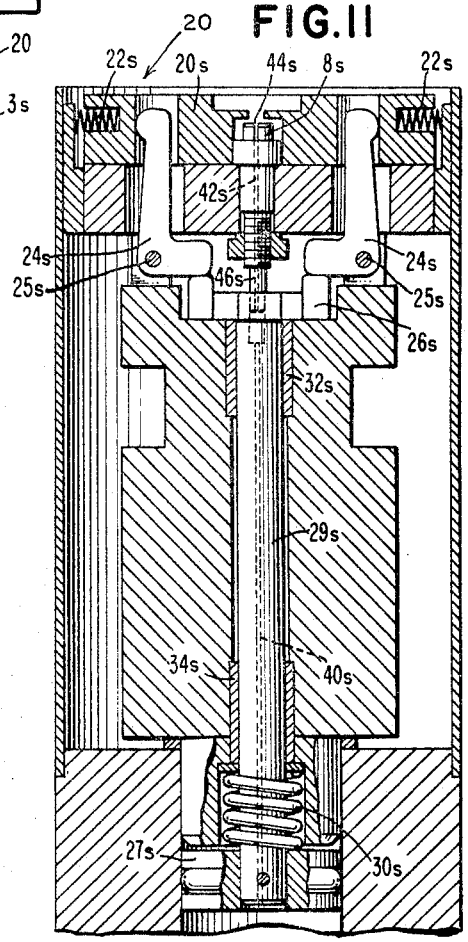

FIG.18
FIG.15
FIG.16
FIG.19
FIG.17
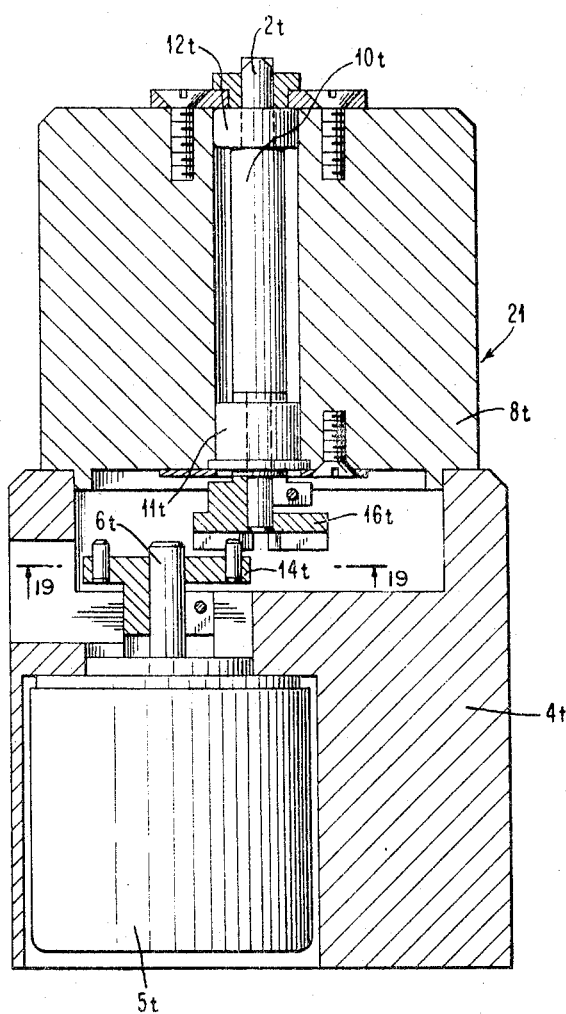
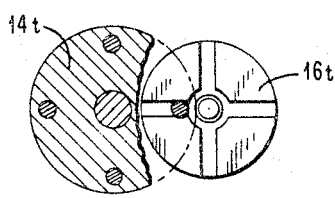
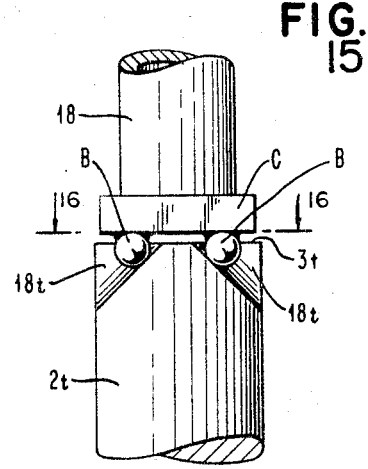
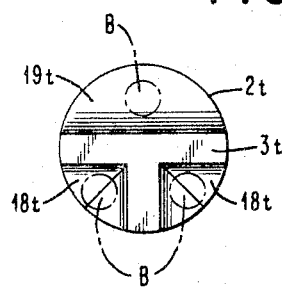
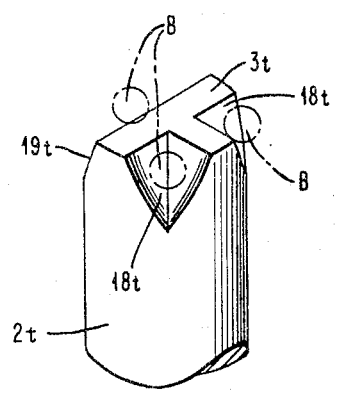

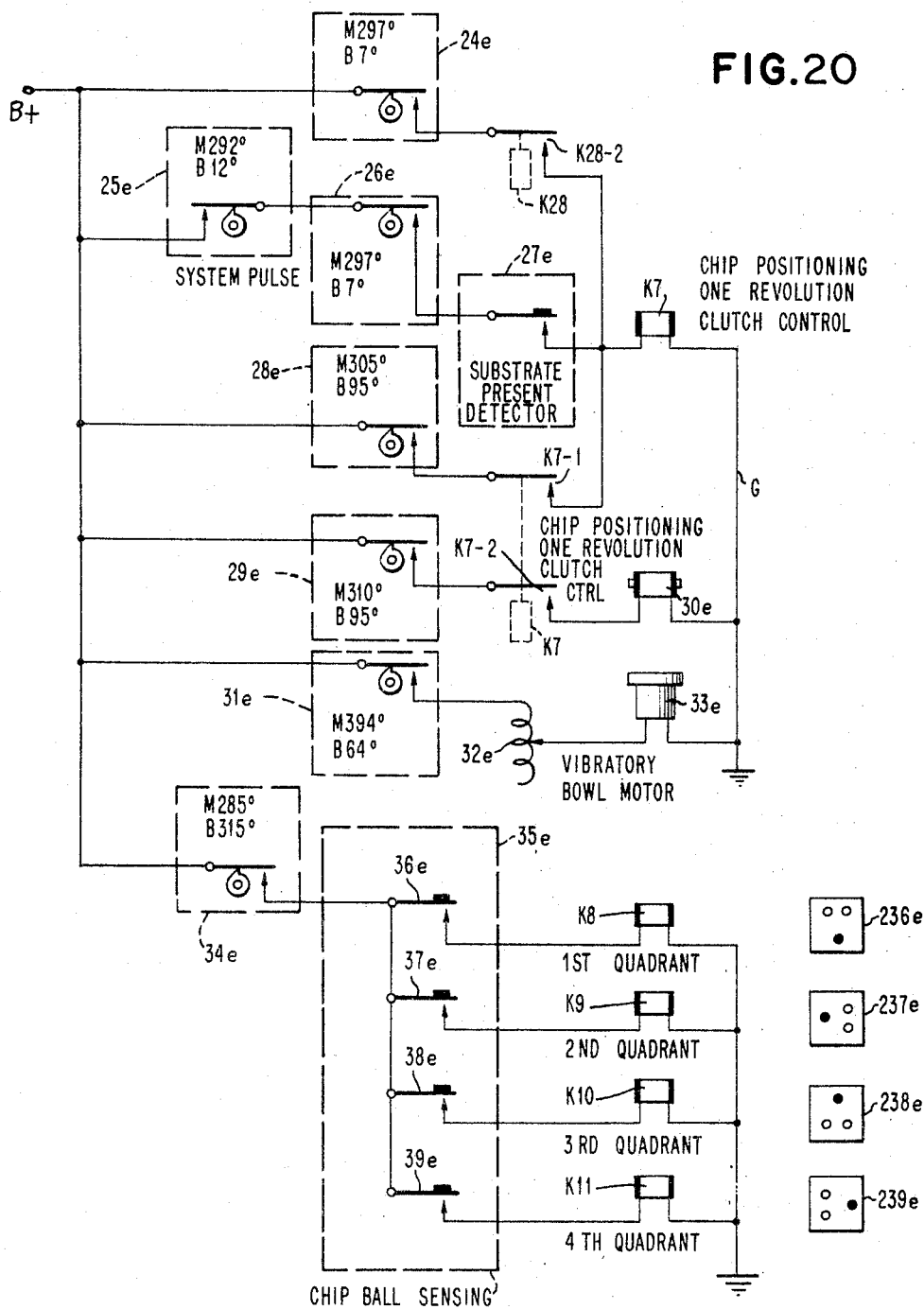

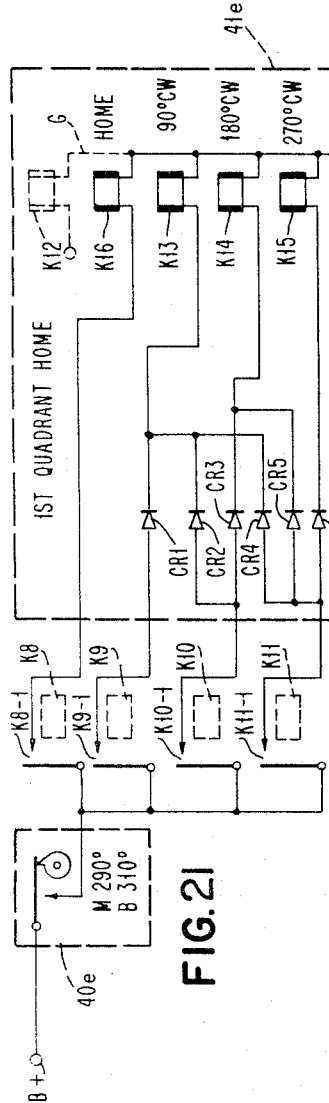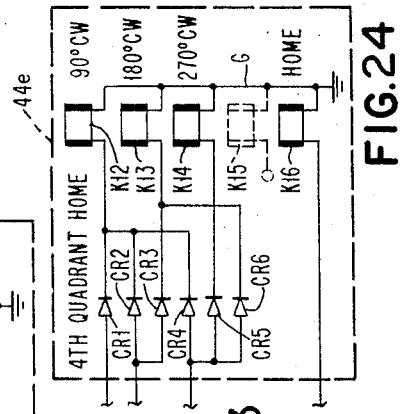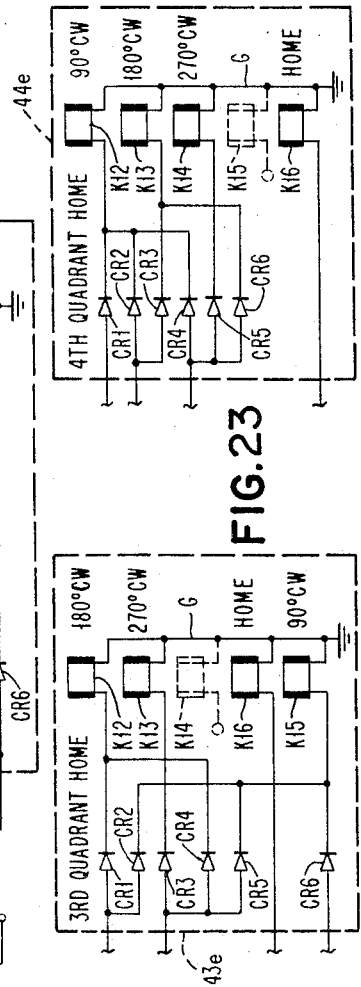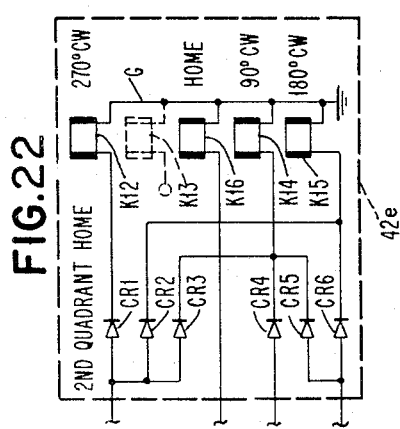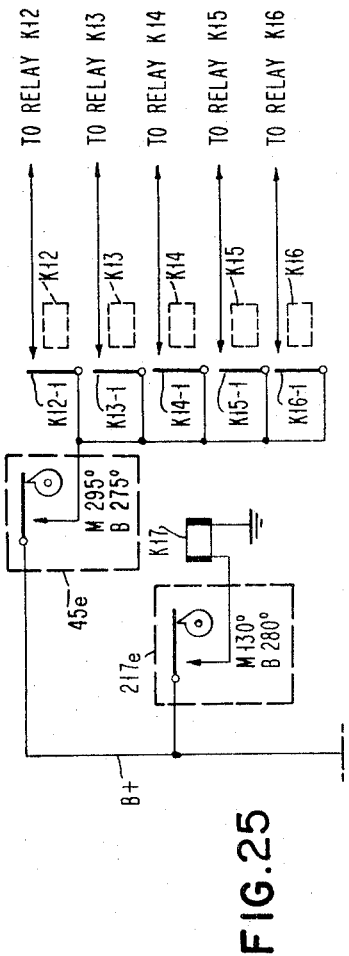

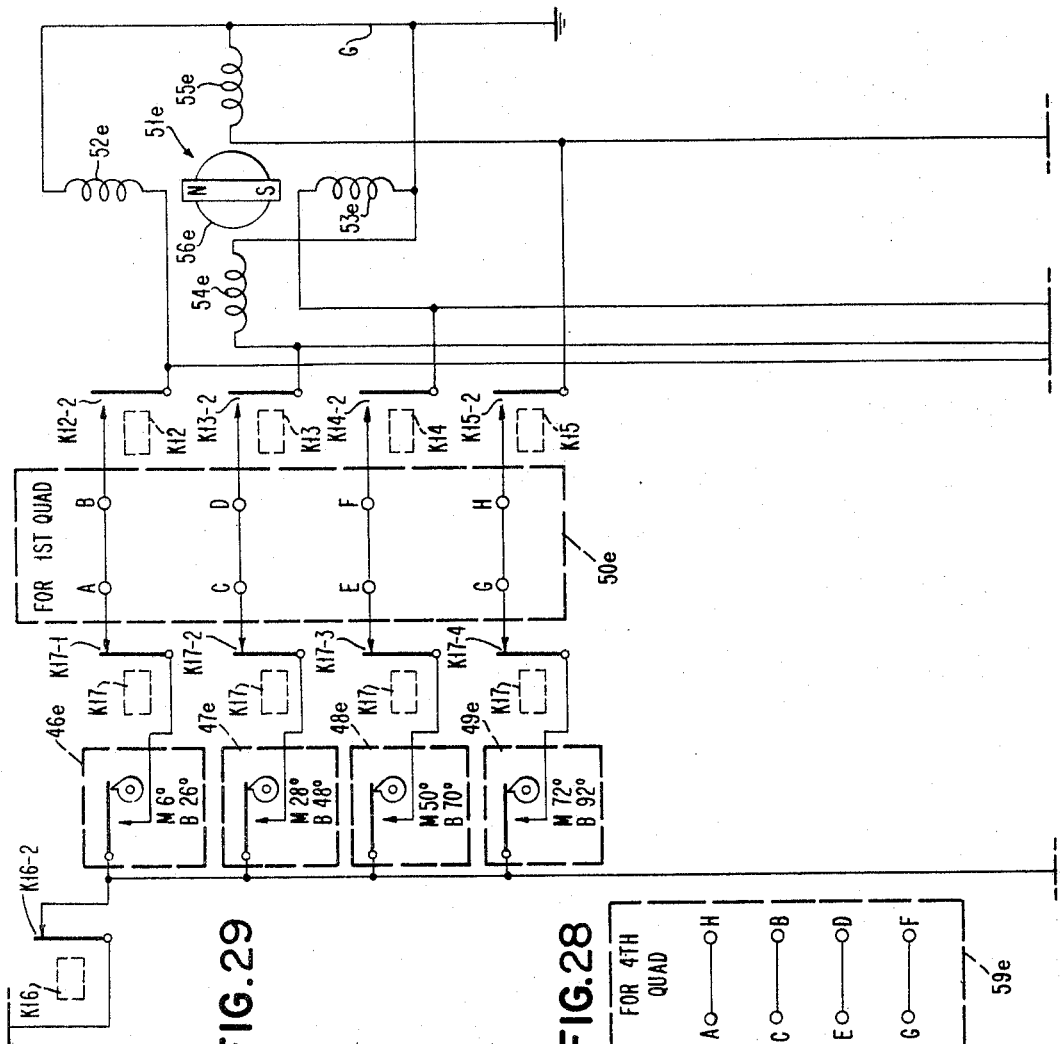

United States Patent Office 3,344,900
Patented Oct. 3, 1967

3,344,900
CHIP ORIENTING CONTROL CIRCUIT FOR A CHIP POSITIONING MACHINE
Joseph G. Drop, Poughkeepsie, N.Y., assignor to International Business Machines Corporation, New York, N.Y., a corporation of New York
Filed May 27, 1965, Ser. No. 459,381
17 Claims. (Cl. 198—33)

This invention relates to an orienting control circuit for a chip positioning machine which automatically assembles semiconductor chips onto printed-circuit substrates.

With the advent of hybrid transistor circuit technology, there arose more stringent requirements of precision, speed and uniformity than had theretofore been achieved in the art of automated circuit manufacture. This hybrid technique involves first the screen printing of the resistors and conductive lands on an alumina substrate. The transistors or diodes in the form of semiconductor chips are then positioned onto the conductive lands. Because the chips are almost microscopic in size, each measuring 0.028 inch square, and are joined to the lands by contact elements in the form of copper balls which are only 0.005 inch in diameter, they cannot be handled by conventional automated assembly techniques. The problem is further complicated by the need for extreme accuracy and precision in positioning the chips on the relatively small and closely-spaced conductive lands which are only 0.005 to 0.015 inch wide and 0.005 inch apart, as well as by the extreme delicacy of the structure involved.

Furthermore, the vast number of circuit substrates required in the manufacture of each digital computer, which is at present the primary use for this hybrid circuit technology, demands that the chip positioning operation be performed at relatively high speeds and with a high yield in order to maintain the high volume required in production. The large number of circuit substrates utilized in a single computer also demands uniformity in manufacture in order to increase the reliability of the final assembled apparatus. In copending application Ser. No. 459,179, filed May 27, 1965 concurrently herewith and entitled "Chip Positioning Machine" there is disclosed a novel machine for automatically positioning transistor and diode chips onto the conductive lands of printed-circuit substrates with precision, uniformity, at a high production rate, and without damage to the structure of either the chips or the substrates.

To accomplish this object, the substrates with the resistors and conductive lands already screen printed thereon are first automatically loaded onto a metal endless conveyor tape which carries the substrates sequentially through a number of work stations. The tape is indexed periodically after each working cycle to move the next succeeding substrate to each of the stations. At the first station, the areas of the conductive lands which are to receive the contact balls of the semiconductor chips are suitably prepared. The tape then conveys the substrate to the first of a series of chip positioning stations.

At each of said positioning stations the semiconductor chips are first aligned upright with their contact balls lowermost and are randomly angularly oriented with the collector ball in either of the four quadrants. Each chip is then picked up on the end of a vacuum needle with the chip in this initial angular orientation. Since it is necessary to align the angular orientation of the chip so that the contact balls coincide with the configuration of the land pattern upon which the chip is to be placed, the original random orientation of the chip on the needle is first sensed. Then the chip is rotated through the angular displacement necessary for proper orientation to coincide with that of the substrate land pattern. The vacuum needle is then lowered to position the chip at a precise location on the pattern. The substrate is then carried by the conveyor tape to the succeeding chip positioning stations in sequence where additional chips are positioned onto various other respective portions of the substrate conductive land pattern.

The present invention relates to an electrical circuit which controls the operations of sensing the initial random orientation of the chip as it is picked up by the vacuum needle and reorienting the chip to the desired "home" orientation corresponding to the substrate land configuration upon which the chip is to be placed.

In the preferred embodiment disclosed herein this control circuit arrangement is disclosed as having a stepping motor to drivingly rotate a chip ball engaging member and having a series of mutually angularly displaced windings, electrical circuit means responsive to the orientation sensing means for energizing said motor windings sequentially to rotate said chip engaging member to an orientation corresponding to said initial orientation of the chip balls, a chip placement head carrying the vacuum needle to bring said member and said chip balls into mutual engagement, adjustable program means for selecting as a home orientation any one of a predetermined set of chip ball orientations, and electrical circuit means for energizing said motor windings sequentially to rotate said member together with the chip engaged thereby to said selected home orientation while the chip remains on said needle.

Although for purposes of illustration the semiconductor chips are disclosed as being of the type wherein each chip constitutes a single diode or transistor, it will be understood that the subject invention may also be utilized to position chips of the type wherein each constitutes a monolithic integrated circuit comprising a plurality of diodes and/or transistors as well as other circuit components together with conductive lands interconnecting same. Furthermore, the subject invention may find utility in other assembly operations where it is desired to position one or more smaller workpieces at precise locations upon a larger workpiece.

The foregoing and other objects, features and advantages of the invention will be more apparent from the following more particular description of a preferred embodiment of the invention, as illustrated in the accompanying drawings, wherein:

FIG. 1 is a side elevation of the chip placement head;

FIG. 2 is a plan view of the chip placement head in combination with each of the specific stations associated therewith;

FIG. 3 is a partial sectional view of the chip blow-off mechanism;

FIG. 8 is a front elevational view in partial cross-section of the vibratory bowl;

FIG. 9 is a top plan view of a specific embodiment of the chip orientation sensor apparatus of my invention;

FIG. 10 is a vertical section taken on line 10—10 of FIG. 9;

FIG. 11 is a vertical sectional view taken on line 11—11 of FIG. 9;

FIG. 15 is a side elevational view in enlarged scale showing the engaging relationship between the semiconductor chip and the head of the orientor apparatus of this invention;

FIG. 16 is top plan view taken on line 16—16 of FIG. 15;

FIG. 17 is a perspective view in enlarged scale illustrating the T-bar configuration of the head of a preferred specific embodiment of the orienting apparatus of my invention;

FIG. 18 is a front elevational view in cross-section of a preferred specific embodiment of the chip T-bar orientor of my invention;

FIG. 19 is a detailed view in broken section illustrating the Geneva drive arrangement;

Figure 4:
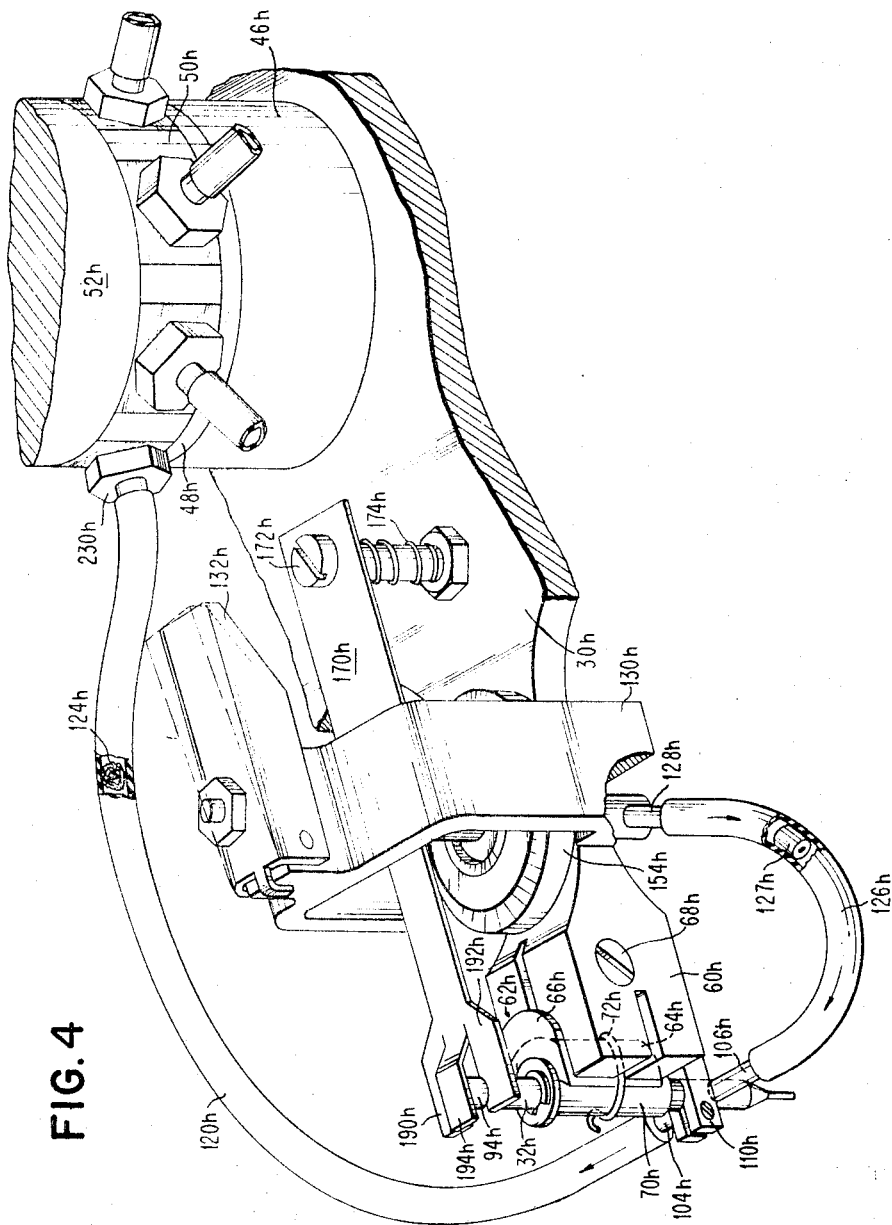
FIG. 4 is an isometric view of a representative arm of the chip placement head showing details of the vacuum pin arrangement.

FIGS. 20–33 inclusive are electrical circuit diagrams showing the electrical control system for the subject machine.

Chip placement head

Referring now to FIGS. 1 and 2, chip placement head 17 includes eight stations, four of which are idle and four of which perform specific functions in regard to feeding, orienting and placing the transistor chips in their proper position upon a substrate. The major moving part of chip placement head 17 is spider 30h which is provided with eight radial arms, each of which supports a vacuum needle 18. Each vacuum needle 18 is adapted to pick up a transistor chip, transport it between stations, and place it in its proper position upon a prefluxed substrate. The spider is actuated by an index mechanism to be described hereinbelow. Prior to each arm of the spider reaching a station, the entire mechanism is in an elevated position to allow the needle to clear obstructions between stations. Upon arriving at the stations, the spider is lowered by the indexing mechanism and lower the vacuum needles into the respective stations. At the termination of the stations' operations, the indexing mechanism raises the spider and rotates the spider arm to succeeding stations.

Before proceeding to a more detailed description of chip placement head 17, the following summary of operations performed at each of the stations will aid in understanding the operation of the system. The ultimate purpose of chip placement head 17 is to provide a transistor chip at placement station 34h (FIG. 2) with its copper ball contacts oriented in such a manner as to exactly mate with the dimple pattern on the substrate land configuration, and deposit the chip in place upon the substrate at the correct time. To accomplish this function, vibratory feed bowl 19 performs the function of providing chips to a chip pick-up station 32b in a queued-up ball-contact down configuration. While the ultimate desire is to place each semiconductor chip on a substrate, this cannot be done unless the chip's ball-contacts are arranged to precisely mate with the substrate dimpled land pattern. Vibratory feedbowl 19 is incapable of assuring this required preset orientation. Accordingly, a vacuum needle 18 picks up a chip at pick-up station 32b and carries it to chip orientation sensor 20. Upon receiving a semiconductor chip, chip orientation sensor 20 performs two functions. First, a pair of guide jaws within the sensor 20 precisely locate the chip with respect to the tip of vacuum needle 18. In addition, when vacuum needle 18 inserts a chip in the ball-contacts down orientation into chip orientation sensor 20, an oddly placed ball-contact acts to deflect a lever arm thereby providing an indication of the chips orientation. A signal is produced indicating the sensed orientation and is transmitted to chip T-bar orientor 21. The T-bar orientor responds to the signal by pre-rotating to a position where its T-bar head will mate with the ball contact pattern. The aforementioned guide jaws are opened and the chip is readied for the next index step. When vacuum needle 18 and its associated chip are next indexed to T-bar orientor station 21, the vacuum needle places the chip upon a rotatable T-bar which as aforestated has been prerotated to fit within the interior of the chip's contact pattern. The T-bar orientor 21 then rotates the chip on the end of vacuum needle 18 to the correct orientation for placement. In addition to correcting the angular orientation of the chip, the mating of the T-bar with the contact pattern of the chip provides a final precise orientation of the chip and assures that its contacts will exactly mate with the substrate dimple pattern. Vacuum needle 18 and its associated chip is then indexed through an idle station to chip placement station 34h where it is placed upon a prefluxed substrate borne by a conveyor tape (not shown).

In addition to the above-described stations, chip placement head 17 is provided with blow-off mechanism 27h and a recycle switch VD1. Blow-off mechanism 27h is positioned intermediate chip orientation sensor 20 and chip T-bar orientor 21. Blow-off mechanism 27h is shown in section in FIG. 3 and comprises an airblast head 31h and an operatively disposed channel 33h which leads to a receptacle. Blow-off station 27h is so positioned that during the indexing of a vacuum needle form chip orientation sensor 20 to chip T-bar orientor 21, the needle tip and its associated semiconductor chip pass directly between airblast head 31h and channel 33h. If for any reason chip orientation sensor 20 provides an output which is indicative of a malformed chip a chip held on end, a chip with insufficient ball-contacts, etc., it energizes a logic circuit which causes a blast of air to be applied to head 31h. This airblast is sufficient to dislodge a chip from the tip of a vacuum needle and cause it to enter channel 33h to the receptacle.

Recycle switch VD1 (FIG. 1) is basically a microswitch with a downwardly extending switch actuating lever 35h. Its operation in combination with other portions of chip placement head 17 will be described in greater detail hereinafter.

Figure 5:
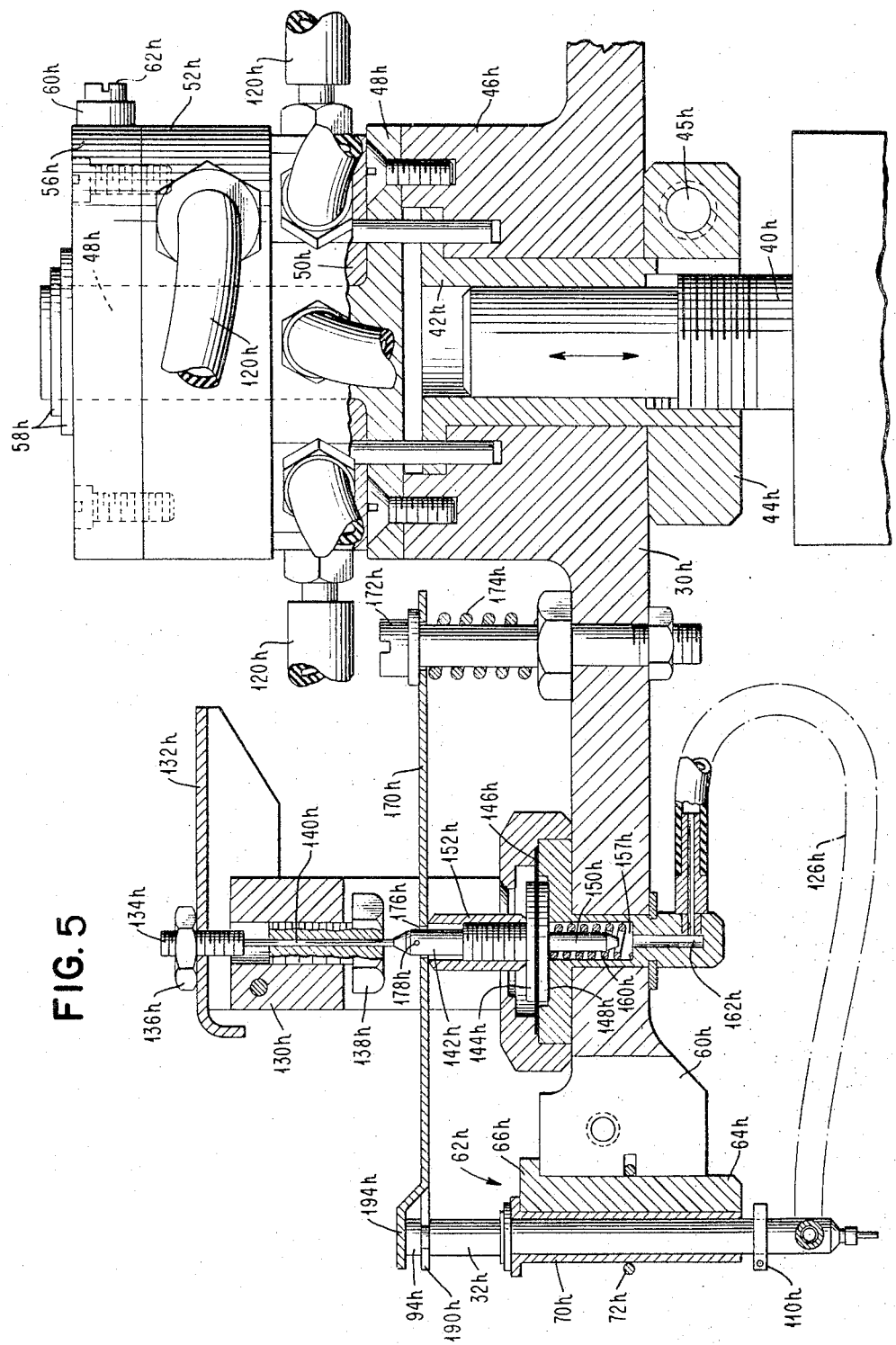
FIG. 5 is a section view of a representative arm of the chip placement head taken along line 5—5 in FIG. 2.

The main drive for chip placement head 17 comes from shaft 26 which feeds directly into head indexing mechanism 25h. This mechanism is described in greater detail hereinafter, but for the time being it will suffice to say that the mechanism provides an indexing drive motion via shaft 40h to spider 30h. It also provides a required vertical displacement of shaft 40h and spider 30h during the time when vacuum needles 18 are being indexed between stations (to prevent damage to the needle tips). As shown in FIG. 5, shaft 40h has a threaded portion which threads into interior threads in bushing 42h. Clamp 44h prevents rotary movement between shaft 40h and bushing 42h once the desired orientation between them has been established. Clamp 44h is tightened by virtue of a bolt which extends through hole 45h. Bushing 42h is shrunk to fit into spider collar 46h to prevent any relative movement therebetween. A centering plate and shaft 48h are rigidly affixed to spider collar 46h via a plurality of set screws. Vacuum distributor 50h fits down over the centering shaft 48h and provides the means for distributing both vacuum and positive air pressure to the respective arms of spider 30h. Directly over and mating with distributor 50h is vacuum manifold 52h which provides the function of supplying and switching vacuum and positive air pressure between various ones of the outputs of distributor 50h. Distributor 50h is rigidly affixed to and rotates with spider collar 46h by virtue of pins 54h which extend through centering plate 48h, bushing 42h and into collar 46h. A manifold top plate 56h fits directly over manifold 52h and is affixed thereto by set screws. Retaining plates 58h fit down over shaft 48h and rigidly force manifold 52h to bear against distributor 50h and provide an airtight seal therebetween. A bushing 60h is rigidly attached to the side of manifold top plate 56h by set screw 62h. The relative position of vacuum manifold 52h with respect to vacuum distributor 50h can be varied by causing a force to be applied to bushing 60h thereby causing a rotation of manifold top plate 56h and manifold 52h about centering plate shaft 48h. The specific operation of this apparatus will be described in detail hereinafter.

Since each arm of spider 30h is structurally identical, only one need be explained. An isometric view of one arm is shown in FIG. 4 and the same arm in section is shown in FIG. 5. Spider arm 30h has an enlarged and slotted end portion 60h with a vertical hole drilled therethrough which is adapted to accommodate a vacuum needle holding fixture 62h. Fixture 62h comprises a round portion of bar stock 64h which has been slotted to accommodate vacuum needle 18. A cap 66h is attached to bar stock portion 64h. The center line of bar stock portion 64h falls to the right of the end of enlarged portion 60h of spider arm 30h. If it is thus desired to adjust the exact location of vacuum needle 32h, cap 66h may be grasped and rotated with a resultant lateral movement of vacuum needle 18 occurring due to the offset between the center line of bar member 64h and the enlarged end 60h. When set screw 68h is tightened, it draws the slotted portions of enlarged member 60h together, thereby gripping vacuum probe holding fixture 62h and preventing any further lateral movement thereof. Vacuum needle 18 is slidably mounted in necked cylinder 70h which is in turn held to vacuum probe holding fixture 62h by spring clip 72h.

Figures 6, 7:
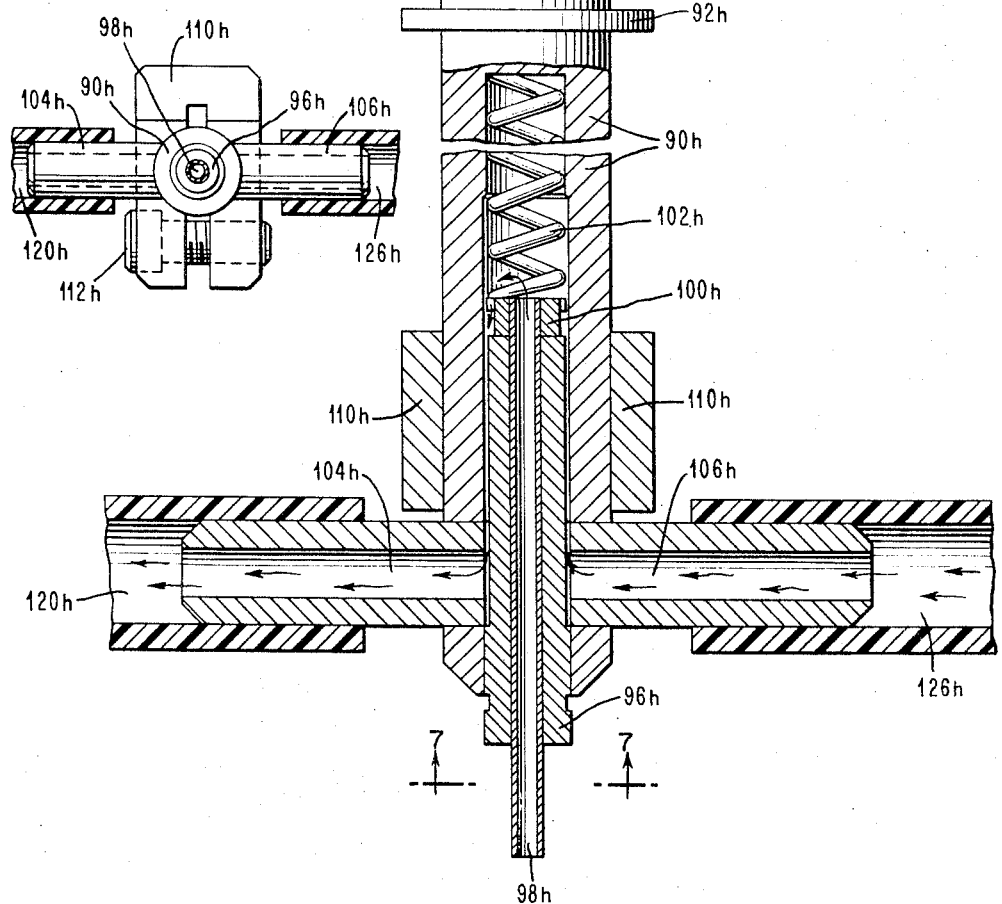
FIG. 6 is a complete section of a vacuum probe.
FIG. 7 is a view of a vacuum probe taken along line 7—7.
Figure 14:
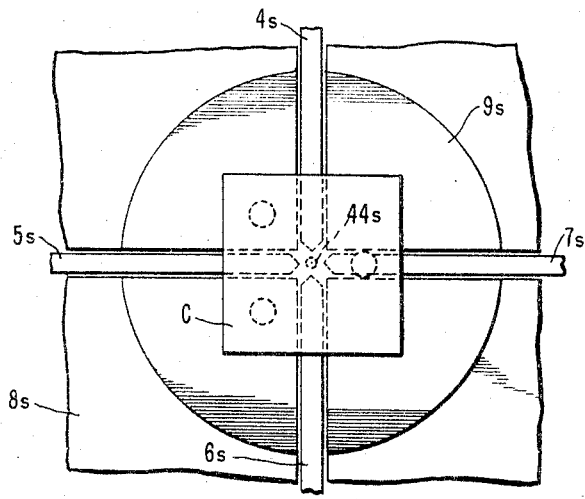
FIG. 14 is a detailed view in greatly enlarged scale showing the sensing station of the chip orientation sensor of my invention.

The structure of a vacuum needle 18 is shown in FIG. 6. Outer housing 90h is a hollow tube with one closed-off end. At the upper extremity of housing 90h, a downward limiting stop 92h and slotted nut 94h are attached. Interior to housing 90h is a fixed bushing 96h which has slidably mounted therein hollow probe pin 98h. Attached to one end of probe pin 98h is an extended diameter collar 100h. A compression spring 102h bears down upon extended collar 100h and acts to maintain probe pin 98h in a downwardly extended position. Extending through housing 90h are a pair of tubes 104h and 106h. It should be noted that bushing 96h is attached to the inner surface of housing 90h only below the entry point of tubes 104h and 106h. Above their attachment point, there is a clearance space between housing 90h and the outer circumference of bushing 96h. Thus, if a vacuum is applied to tube 104h, not only will air be drawn up through probe pin 98h and down through the clearance area between bushing 96h and probe body 90h, but also, air will be drawn into tube 106h, around bushing 96h and into tube 104h. Thus, if a vacuum is applied to tube 104h and there is a semiconductor chip held at the end of probe pin 98h, all of the air drawn through vacuum needle 18 must come via tube 106h. If on the other hand, there is no chip held by probe pin 98h, a significant portion of the air drawn into tube 104h will be drawn through probe pin 98h thereby considerably reducing the vacuum applied via tube 106h. As will become hereafter apparent, this fact is utilized to control the recycle actuating mechanism.

An adjustable stop 110h surrounds housing 90h and provides a lower limiting stop for the travel of vacuum needle 18. FIG. 7 better shows the details of stop 110h. By causing nut 112h to be loosened, stop 110h may be moved either up or down on housing 90h. As can be seen by examining FIG. 8, vibratory feed bowl 19 has a stop 40b associated therewith. When vacuum probe 32h is lowered into feed bowl 19, stop 110h is adjusted to impact with stop 40b to prevent the tip of probe pin 98h from touching the surface of a semiconductor chip and thereby being damaged.

Figure 13:
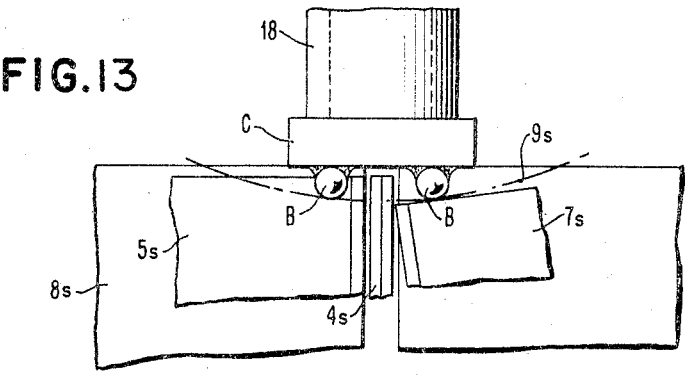
FIG. 13 is a detailed view in broken section in greatly enlarged scale of a side elevational view of the sensing station.
Figure 12:
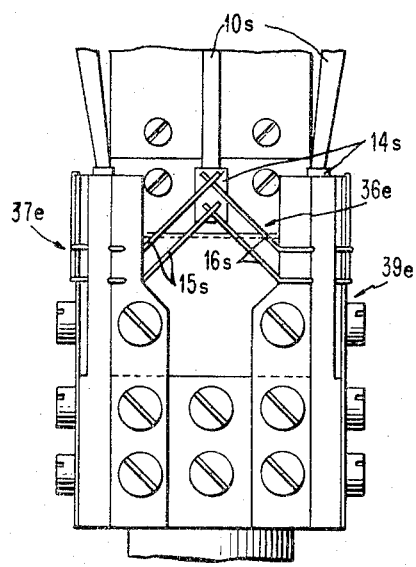
FIG. 12 is a detailed view in broken section taken on line 12—12 of FIG. 10.

In FIGS. 9 to 14 there is illustrated a preferred specific embodiment of the semiconductor chip orientation sensor 20 for use on the combination apparatus of the invention. The chip orientation sensor 20 has a base 2s which serves as a mounting element for the numerous components of the sensor. A head 3s is affixed to the top of base 2s, as most clearly shown in FIGS. 10 and 11. The actual sensing elements of the orientation sensor 20 are four separate blade elements 4s, 5s, 6s and 7s, shown in greatly enlarged scale in FIG. 14. When a semiconductor chip C is moved downwardly over the blades and properly positioned relative to same, one of the ball contacts B will depress one, and only one, of the blades. In FIG. 13 there is illustrated a ball contact B depressing blade 7s. It can be seen that since the semiconductor chip is square there are four possible angular positions in which it can be positioned on the probe 18, and only one of which is the proper position.

The four blades 4s, 5s, 6s and 7s are positioned in a blade guide 8s in which there are provided four separate slots that receive the blades. As most clearly indicated in FIG. 13, a concave depression 9s is machined in the top surface of blade guide 8s. The concave depression 9s allows sufficient clearance for the two remaining ball terminals B that do not contact and depress the knife blades. As more clearly shown in FIG. 10, each of the blades is supported on an L-shaped pivot arm 10s. Upright pivotal supports 11s, provided with bifurcated portions 12s to receive and pivotally support arms 10s, are mounted in base 2s. It can be seen that when a blade is depressed the lower end of the L-shaped arm 10s is pivoted outwardly. The lower end of arms 10s are provided with insulating pads 14s which serve as a means to close contacts 15s and 16s of electrical switches 36e, 37e, 38e and 39e. Both contacts 15s and 16s are mounted on base 2s and insulated therefrom. Outward movement of the lower end of arm 10s forces the electrical contacts 16s outwardly into contact with contacts 15s to close the electrical switch. It can be seen, assuming that the semiconductor chip is not defective, that each of the four possible positions will produce a different signal considering the four separate switches. An electrical signal is then produced with this switch arrangement which is used to actuate a chip T-bar orientor at the following station to properly turn the chip on the probe, if such is necessary, when it arrives at the station.

In order to move accurately position the semiconductor chip C relative to the blades 4s, 5s, 6s and 7s, a pair of opposing guide jaws 20s are provided which are positioned above the blades. In FIGS. 9 and 11, there is depicted the structure of the guide jaws. The jaws 20s are each provided with two diagonal and transverse surfaces adapted to slidably engage the adjacent edges of the chip. Compression springs 22s are provided to bias the jaws 20s inwardly into operative engagement with a chip to be positioned over the blades. The jaws in effect form a guide channel that corrects any minor misalignment of the chip. In order to open the jaws 20s after the sensing operation is complete, there is provided an air operated actuating mechanism. Two L-shaped arms 24s are pivotally mounted on the head by pins 25s with the upper leg portions in abutting engagement with the jaws 20s and with the lower end portions directed radially inwardly. An abutment element 26s engages both of the inwardly directed legs of arms 24s. A piston 27s is slidably mounted in a cylinder 28s and connected to piston rod 29s. Upward movement of piston 27s forces the abutment element 26s upwardly into actuating engagement with the arms 24s, thus spreading the jaws to allow easy removal of a semiconductor chip from the sensing station. The jaws 20s are opened sufficiently wide to allow a chip that is slightly irregular in shape to leave the station unhindered by the jaws. Closure of the jaws accurately and positively aligns the chip over the blades in position for the sensing operation. Spring 30s biases the piston 27s downwardly to allow springs 22s to close the jaws. A piston rod 29s is slidably supported by sleeve bearings 32s and 34s. Piston 29s is also provided with a longitudinally extending air passage 40s which communicates with air passage 42s, which terminates in opening 44s in the center of blade guide 8s. In operation, when air under pressure is admitted to cylinder 28s, air passes through passages 40s and 42s to escape through opening 44s to blow the chip from the sensing station if it should become dislodged from the probe or any part thereof. The air blast is delayed for an instant that it takes for the top portion of piston rod 29s to couple with the extending tube 46s. A cylindrically shaped housing 36s having a central aperture 38s encloses the entire chip orientation sensor mechanism.

In operation, a semiconductor chip C with the ball terminals extending downwardly is lowered by the pickup probe through aperture 38s and between the jaws 20s which are normally in closed guiding position. The chip is then gently urged downwardly with one ball contact of the chip depressing one of the blades which makes possible the production of an electrical signal. Unless only a single blade is forced down the chip is rejected from the probe after it is removed from the sensor. If, however, the chip is held in an upside down position on the probe, all the blades will be actuated. This will also produce a signal instructing the machine to blow the chip off the probe. Further, if the terminal ball contact intended to contact the knife blade is missing or off location, no blades will be contacted. In this instance the chip will also be rejected. After the sensing operation is completed, the guide jaws are opened by the piston and cylinder, and the probe with chip still attached raised and moved to the chip T-bar orientor 21. An instant after the jaws 20s are opened a stream of air will issue from opening 44s to blow out the chip if it should become dislodged from the probe, or any part thereof that may have broken off. This leaves the sensing station clear to receive the next chip.

Chip T-bar orientor

After the semiconductor chip C has been picked up on the vacuum needle 18, the position of the ball contacts B is determined by the chip orientation sensor 20. Since there are four possible positions that the ball contacts B can assume, since the chip is square in shape, the probability is that three out of four times the chips will need to be oriented to the proper position on the probe prior to its placement on the substrate. This function is performed by the chip T-bar orientor 21. A preferred specific embodiment of the chip orientor unit is detected in FIGS. 15 through 19.

In general, the chip C while held on the probe or vacuum needle 18 is rotated to the desired position by the chip orientor 21. The chip orientor 21 has a head 2t provided with a T-shaped configuration 3t, which when properly oriented with the chip will form a mechanical engagement with the triangularly arranged ball teminals on the lower side of the chip. The mechanical engagement between a typical semiconductor chip C and the T-shaped configuration 3t on head 2t is clearly illustrated in FIGS. 15, 16 and 17 of the drawings. As shown, the two sectors 18t on opposite sides of the upright bar of the T-shaped configuration are each defined by a pair of downwardly inclined intersecting planar surfaces, while the sector 19t is defined by a single downwardly inclined planar surface. This configuration has the function of accurately centering the ball terminals B of chip C. Thus, the chip is aligned with reference to the ball contacts, rather than the side edges of the chip. The position of the balls is critical in the positioning of the chip on the substrate.

The chip T-bar orientor 21 has a base 4t in which is mounted a four-position stepping motor 5t. The motor 5t is mounted with the shaft 6t in an upright vertical position as shown in FIG. 18 of the drawings. A head support 8t is mounted on the top of base 4t above motor 5t. Shaft 10t is rotatably mounted in head support 8t by two bearings 11t and 12t. The head 2t with the T-shaped configuration facing upwardly is rigidly fixed to shaft 10t and protrudes above the top of head support 8t. The shaft 6t of motor 5t is connected in driving relation to shaft 10t by a Geneva drive mechanism consisting of a Geneva driver 14t and a Geneva wheel 16t, as illustrated in FIG. 18. A detailed view of the Geneva drive mechanism is shown in FIG. 19.

In operation an electrical signal produced by the chip orientation sensor 20, described previously, is utilized to drive motor 5t to thereby position the head 2t in the proper relative position to engage the ball terminals B of the chip C when it is transferred to the chip orientor 21. The Geneva drive mechanism provides a very precise positioning of the head 2t. Even in the event that the motor 5t stops several degrees from the exact desired angular location, this discrepancy will not cause a material change in the positioning of the head 2t. When the head 2t is rotated to the proper position, the probe 18 with a semiconductor chip affixed will be lowered by the turret head 17 into engagement with the head 2t. The motor 5t is then actuated by a suitable circuit arrangement to rotate the head 2t and also the chip relative to the pickup probe to the desired position which will then permit it to be properly placed on the substrate. The chip C is thus properly oriented on the probe 18 of turret placement head 17 relative to substrates being indexed on tape conveyor 1. The positioning operation consists of properly orienting the ball terminals so that they will contact the lands of the printed circuitry. The orientor of my invention very precisely positions the ball terminals B with the sloping surfaces of the sectors 18t and 19t of head 2t. Even though the ball terminals B may be slightly dislocated on the chip relative to the edges thereof, an accurate positioning of the chip is obtained both angularly and in the x–y plane.

Referring now to FIG. 20, there is shown the initial portion of one of the plural identical circuits each controlling a respective one of chip placement heads 17. Since all of these circuits are identical, only one will be shown and described. Pulse timing switches 25e and 26e are in series so that the output of switch 26 will be the logical "AND" function of both switches. In series with the output of switch 26e is a substrate presence detector switch 27e. Each switch 27e of said plural identical circuits is physically located one tape index position before its respective chip positioning head 17. If a substrate S is present so as to close detector switch 27e, the concurrent transmission of pulses by system pulse timing switch 25e and pulse timing switch 26e will energize chip positioning control relay K7 so as to close contacts K7–1 to maintain relay K7 energized through pulse timing switch 28e and also to close contacts K7–2 to permit pulse timing switch 29e to energize the chip positioning one-revolution clutch control solenoid 30e. The latter in turn actuates one-revolution clutch 31 (shown at FIG. 4 of said copending application Ser. No. 459,179) to actuate chip positioning head 17 through one cycle of operation.

Vibratory feeder bowl 19 must not vibrate during the time interval when vacuum needle 18 is picking up a chip C from the pick-up point of the bowl. The solenoid motor 33e which vibrates bowl 19 is energized during the proper portion of the cycle by pulse timing switch 31e through the feed control 32e.

The printed circuit pattern on substrate S is designed so that the collector pad P, that is, that portion of the conductive land L which receives the collector ball B of chip C, may be oriented in a direction toward either of the four lateral edges of substrate S. Therefore, before chip C is positioned by vacuum needle 18 onto the pads P of substrate S, chip C must first be angularly oriented so that its balls B correspond to the orientation of the pads P at that particular location on substrate S to which chip C is to be assembled. Chip C is first oriented by vibratory feeder bowl 19 to any random one of four possible angular orientations which are designated as the first, second, third and fourth quadrants, depending upon the direction in which the collector ball is located. Each of these quadrants is indicated schematically at 236e, 237e, 238e and 239e wherein the collector ball is designated by the solid circular area and the base and emitter balls are shown as non-solid circles.

Since the initial orientation of chip C on the end of vacuum needle 18 is randomly in any one of these four possible angular orientations, it is first necessary to sense each chip to detect which of these four possibilities has materialized. The T-bar 2t of the chip orientor 21 is then rotated to the same orientation as chip C and the T-bar 2t then engages balls B of chip C. The T-bar 2t together with chip C is then rotated to the selected "home" position thereby finally orienting chip C to the desired orientation so as to properly align balls B with the respective land pads P upon which balls B will rest when chip C is positioned upon substrate S.

In order to determine the initial orientation of chip C when it is first picked up from the pick-up location of vibratory bowl feeder 19 by a vacuum needle 18, there is provided a chip ball sensing device indicated generally by the reference numeral 35e and comprising a plurality of switches 36e, 37e, 38e, 39e, each adapted to be closed when its respective feeler arm is actuated by contact with a collector ball B of the chip C being sensed. Each of these switch feeler arms will be engaged by a collector ball B when the latter is in a respective one of the four quadrants. That is, the feeler arm of switch 36e will be engaged by a collector ball in the first quadrant, that of switch 37e by a collector ball in the second quadrant, that of 38e by a collector ball in the third quadrant, and that of switch 39e by a collector ball in the fourth quadrant.

The switches 36e, 37e, 38e, 39e have one terminal connected to a common junction in turn connected to a pulse timing switch 34e and the other terminal connected to a respective one of the relays K8, K9, K10, K11 thereby energizing one of the latter when its corresponding switch is closed by virtue of the collector ball making contact with that switch feeler arm in that particular quadrant.

In order that the printed circuit pattern may be designed so that the collector pad P is oriented in any selected one of the four directions the control circuitry is arranged so that any one of the four quadrants may be selected as the "home" position in which the collector ball B will lie after chip C has been finally oriented and is ready for positioning upon the pads P of substrate S. In order to select which of the four quadrants will be "home" position for each chip placement head 17, the circuit components are switched by conventional means to provide any selected one of the four network configurations shown in FIGS. 21 to 24 inclusive. FIG. 21 shows the first quadrant as the "home" position, FIG. 22 the second quadrant, FIG. 23 the third quadrant, and in FIG. 24 the fourth quadrant is the "home" position.

For the purposes of illustration, let it be assumed that the circuit is programmed so that the first quadrant is selected as the "home" position and that when chip C is initially picked up on the end of vacuum needle 18 from vibratory bowl feeder 19 it is oriented so that its collector ball B is in the second quadrant as shown schematically at 237e. Therefore, when the chip orientation is sensed, the feeler arm of switch 37e will be engaged by the collector ball B to close switch 37e and thereby permit a pulse from pulse timing switch 34e to be transmitted to relay K9 thereby energizing the latter.

Referring now to FIG. 21 which is the circuit configuration for the first quadrant as the "home" position, the energization of relay K9 will close its contacts K9-1 to transmit a pulse from pulse timing switching 40e through diode CR1 to energize relay K13 thereby indicating that chip C is initially 90° in a clockwise direction from the "home" position. Relay K13 will be held closed through its own contacts K13-1 by pulse timing switch 45 shown in FIG. 25.

Referring now to FIG. 29 there is shown the control circuitry to first rotate the T-bar chip orientor to pick-up orientation in alignment with the initial orientation of the chip on vacuum needle 18, and then to rotate the T-bar and chip C therewith to the final selected "home" position.

For this purpose there are provided a plurality of pulse timing switches 46e, 47e, 48e, 49e having one end connected to a common junction in turn connected to the B+ line through the normally-closed relay contacts K16-2. The opposite end of each of these pulse timing switches is connected to a respective one of the normally-closed relay contacts K17-1, K17-2, K17-3, K17-4 connected in turn to the respective terminals A, C, E, G. The latter terminals are connected respectively to the group of terminals B, D, F, H in a manner depending upon which quadrant is selected as the "home" position. FIG. 29 indicates at 50e the mode of connection when the first quadrant is selected as the "home" positon. The interconnections between these terminals for the second, third and fourth quardants as the "home" position in indicated respectively at 57e, 58e and 59e in FIGS. 26 to 28. Each of the terminals B, D, F and H is connected to a respective pair of normally-open relay contacts K12-2, K13-2, K14-2, and K15-2.

The reference numeral 51e indicates generally a conventional stepping motor comprising four fixed field windings 52e, 53e, 54e and 55e located around an armature 56e at spaced angular intervals of 90 degrees. The rotating armature 56e is in the form of a permanent magnet having a north pole at end end and a south pole opposite thereto. When one of the windings 52e, 53e, 54e, 55e is energized it generates lines of magnetic flux oriented in the particular respective direction of the axis of the energized winding to cause the north pole of armature 56e to align itself with said winding. By energizing windings 52e, 53e, 54e, 55e in sequence in a counterclockwise direction, armature 56e will be rotated counterclockwise in angular increments of 90 degrees each time the next succeeding winding is energized.

Returning to the illustrative example in which the first quadrant was selected as the "home" position and the initial orientation of chip C on vacuum needle 18 was such that the collector ball B was oriented in the second quadrant as symbolized at 237e to close switch 37e and thereby energize relays K9 and K13, energization of the latter relay closes its contacts K13-2 in FIG. 29 to permit pulse timing switch 47e to energize stepping motor field winding 54e. This causes armature 56e of stepping motor 51e to rotate 90 degrees. Since the T-bar of chip orientor 21 is mechanically driven by stepping motor armature 56e, said T-bar is thereby rotated 90 degrees to the second quardant orientation in alignment with the ball orientation of chip C.

Since only relay K13 was energized whereas relays K12, K14 and K15 were not energized in this particular example, relay contacts K12-2, K14-2 and K15-2 remain open and hence pulse timing switches 46e, 48e and 49e do not energize the other field windings 52e, 53e and 55e of stepping motor 51e.

At 180 degrees later in the cycle a pulse is transmitted through pulse timing switch 60e in FIG. 33 and relay contacts K17-5 which were previously closed by energization of relay K17 by pulse timing switch 217e in FIG. 25. This also opens relay contacts K17-1, K17-2, K17-3 and K17-4 in FIG. 29 to disconnect pulse timing switches 46e, 47e, 48e and 49e from stepping motor windings 52e, 53e, 54e and 55e.

Figure 33:
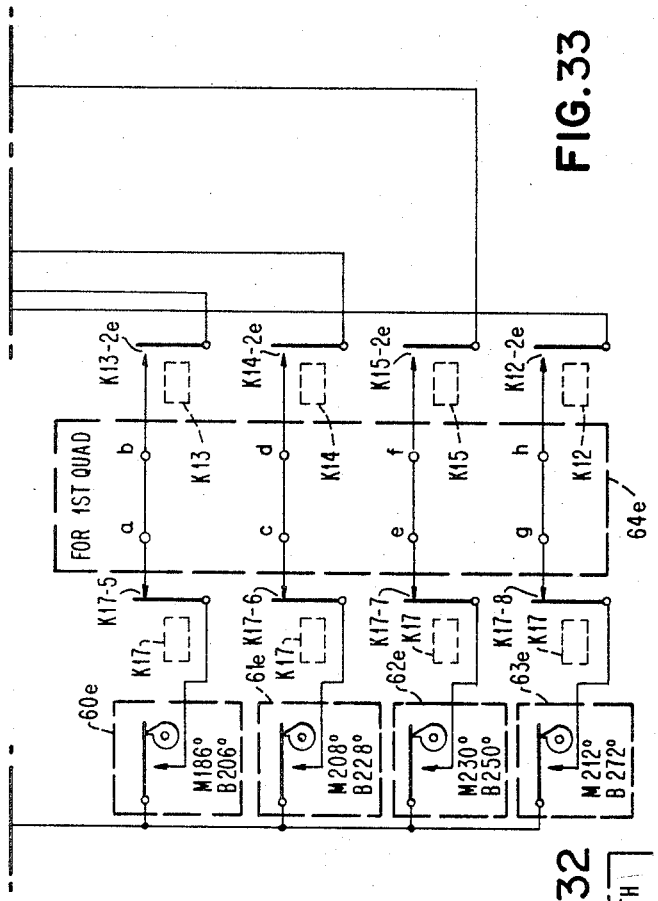
Figure 32:
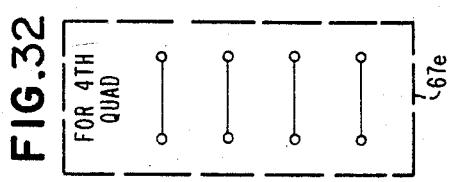
Figure 31:
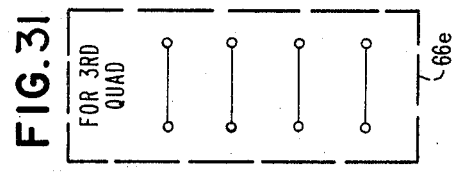
Figure 30:
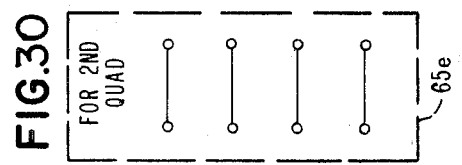

The reference numerals 60e, 61e, 62e and 63e in FIG. 33 indicate a plurality of pulse timing switches having their input ends joined together and connected in series with relay contacts K16–2. Each of these switches is connected to one of the group of terminals a, c, e, g through a respective one of the normally-open contacts K17–5, K17–6, K17–7, K17–8. Terminals a, c, e, g are connected to another group of terminals b, d, f, h in the manner shown at 64e in FIG. 33 when the circuitry is programmed for the first quadrant as the "home" position. When programmed so that one of the other quadrants is the "home" position, these terminal groups are connected in the manner shown at 65e, 66e and 67e in FIGS. 30 to 32.

Now that the T-bar of chip orientor 21 has been oriented so as to be in alignment with the ball configuration of the chip C, the T-bar is rotated by stepping motor 51e to angularly displace chip C to the desired "home" position with its collector ball B in the first quardant as shown at 236e in FIG. 20.

Since relay K13 is energized, contacts K13–2a are open so that pulse timing switch 60e does not energize field winding 54e of stepping motor 51e. At 22 degrees after the initiation of the pulse transmitted throuh switch 60e pulse timing switch 61e sends a pulse through relay contacts K17–6 which was previously closed by energization of relay K17 by pulse timing switch 217e. Since relay K14 is not energized, contacts K14–2 remain closed and the pulse transmitted by switch 61e energizes winding 53e of stepping motor 51e.

At 22 degrees later in the cycle, pulse timing switch 62e transmits a pulse through relay contacts K17–7 and K15–2a to stepping motor winding 55e. Motor armature 56e and the chip orientor T-bar are thereby angularly displaced through another 90 degree increment. At 22 degrees later in the cycle, pulse timing switch 63e transmits a pulse through relay contacts K17–8 and normally closed contacts K12–2 to energize winding 52e of stepping motor 51e, and thereby rotating motor armature 56e and the T-bar through another 90 degree increment. This final angular displacement brings armature 56e together with the T-bar and chip C to the final "home" position with the collector ball B of chip C in the first quadrant as shown at 236e in FIG. 20.

To illustrate briefly the mode of operation when chip C is oriented on vacuum needle 18 so that its collector ball B is initially in the first quadrant "home" position, the feeler arm of switch 36e will then be contacted by collector ball B to close switch 36e and thereby energize relay K8 through pulse timing switch 34e. This closes relay contacts K8–1 in FIG. 21 to permit pulse timing switch 40e to energize relay K16 thereby indicating that chip C is already in the programmed "home" position. Energization of relay K16 opens normally-closed relay contacts K16–2 so as to prevent any pulses from being transmitted through any of the pulse timing switches 46e, 47e, 48e, 49e and 60e, 61e, 62e, 63e. As a result stepping motor 51e and the T-bar of chip orientor 21 remain stationary and are neither rotated to align the T-bar with the chip nor rotated to orient the chip, since the latter is already in the final programmed "home" position.

As a further example, let it be assumed that the initial orientation of chip C on vacuum needle 18 is such that collector ball B is in the fourth quadrant as shown at 239e, in FIG. 20. Collector ball B will then contact the feeler arm of switch 39e to close the latter and thereby energize relay K11 thus closing relay contacts K11–1 to permit pulse timing switch 40e to transmit a pulse through diodes CR4, CR5 and CR6 thereby energizing relays K13, K14 and K15. This indicates that the sensed chip is 270 degrees clockwise from the programmed "home" position. The energization of these relays closes the normally-open relay contacts K13–1, K14–1 and K15–1 which hold these relays energized for the duration of the pulse transmitted through timing switch 45e, and also closes the normally-open relay contacts K13–2, K14–2 and K15–2 to permit pulse timing switches 47e, 48e and 49e to energize stepping motor windings 54e, 53e and 55e in sequence, thereby rotating the chip orientor T-bar 270 degrees to align it with chip C.

Stepping motor 51e and chip orientor T-bar are then angularly displaced to the first quadrant "home" position in the following manner. Pulse timing switches 60e to 63e inclusive close at the angular phase instants designated in FIG. 33. Since relays K13, K14 and K15 are energized, the normally-closed relay contacts K13–2e, K14–2e and K15–2e are open, thereby preventing pulse timing switches 60e, 61e and 62e from energizing stepping motor windings 53e, 54e and 55e. Since relay K12 is not energized, its normally-closed contacts K12–2e remain closed to permit pulse timing switch 63e to transmit a pulse to energize stepping motor winding 52e thereby rotating motor armature 56e and the chip orientator T-bar 90 degrees to orient the chip at the "home" position with the collector ball in the first quadrant as shown at 236e in FIG. 20.

In a similar manner the control circuitry can be initially set up and programmed so that either the second, third or fourth quadrant becomes the "home" position to which chip C will be finally oriented, so that when chip C is placed upon the conductive lands L of printed-circuit substrate S the balls B of the chip C will be in proper alignment with the land pattern at that particular chip location of the printed circuit. In the event that one of these other quadrants is selected as the "home" position, conventional switching is provided so that the components of circuit 41e in FIG. 21 are reconnected in the manner shown at 42e in FIG. 22 for the second quadrant, at 43e in FIG. 23 for the third quadrant, and at 44e in FIG. 24 for the fourth quadrant. Also, the terminal connecting network 50e of FIG. 29 is changed to the network 57e of FIG. 26 for the second quadrant, the network 58e of FIG. 27 for the third quadrant, and the network 59e of FIG. 28 for the fourth quadrant. Similarly, the terminal connecting network 64e of FIG. 33 is changed to the network 65e of FIG. 30 for the second quadrant, the network 66e of FIG. 31 for the third quadrant, and the network 67e of FIG. 32 for the fourth quadrant.

If chip C is initially picked up by vacuum needle 18 with its collector ball B oriented in the third quadrant as at 238e in FIG. 20, then switch 38e will be closed to energize relay K10 closing its contacts K10–1 in FIG. 21, to energize relay K13 through diode CR2 and relay K14 through diode CR3. The chip orientor T-bar is thereby rotated to the third quadrant, then engages chip C, and then re-orients the latter to the programmed "home" position, all in a manner which will be obvious from the above description in connection with the previous illustrative examples.

What is claimed is:

1. In a chip positioning machine for assembling semiconductor chips to printed-circuit substrates and having vacuum needle means adapted to pick up a chip and to place said chip upon said substrate, and a rotatable chip engaging member, the improvement comprising:
   stepping motor means to drivingly rotate said chip engaging member and having a series of mutually angularly displaced windings,
   means for bringing said member and said chip into mutual engagement,
   adjustable program means for selecting as a home orientation any one of a predetermined set of orientations,
   and electrical circuit means for energizing said motor windings sequentially to rotate said member together with the chip engaged thereby to said selected home orientation.

2. In a chip positioning machine for assembling semiconductor chips to printed-circuit substrates and having vacuum needle means adapted to pick up a chip and to place said chip upon a substrate, means for sensing the initial orientation of said chip on said needle means, and a rotatable chip engaging member, the improvement comprising:
- stepping motor means to drivingly rotate said chip engaging member,
- electrical circuit means responsive to said sensing means for energizing said motor to rotate said member to an orientation corresponding to said initial orientation of the chip,
- means for bringing said member and said chip into mutual engagement,
- and electrical circuit means for energizing said motor to rotate said member together with the chip engaged thereby to a predetermined home orientation.

3. In a workpiece positioning machine having vacuum needle means adapted to pick up a workpiece and to place the latter, means for sensing the initial orientation of said workpiece on said needle means, and a rotatable workpiece engaging member, the improvement comprising:
- stepping motor means to drivingly rotate said workpiece engaging member,
- electrical circuit means responsive to said sensing means for energizing said motor to rotate said member to an orientation corresponding to said initial orientation of the workpiece,
- means for bringing said member and said workpiece into mutual engagement,
- adjustable program means for selecting as a home orientation any one of a predetermined set of orientations,
- and electrical circuit means for energizing said motor to rotate said member together with the workpiece engaged thereby to said selected home orientation.

4. In a chip positioning machine for assembling semiconductor chips to printed-circuit substrates and having vacuum needle means adapted to pick up a chip and to place said chip upon said substrate, means for sensing the initial orientation of the contact balls of said chip while the latter is on said needle means, and a rotatable chip ball engaging member, the improvement comprising:
- stepping motor means to drivingly rotate said chip ball engaging member and having a series of mutually angularly displaced windings,
- electrical circuit means responsive to said sensing means for energizing said motor windings sequentially to rotate said member to an orientation corresponding to said initial orientation of the chip balls,
- means for moving said needle means to bring said member and said chip balls into mutual engagement,
- adjustable program means for selecting as a home orientation any one of a predetermined set of chip ball orientations,
- and electrical circuit means for energizing said motor windings sequentially to rotate said member together with the chip to said selected home orientation while the chip remains on said needle means.

5. In a chip positioning machine for assembling semiconductor chips to printed-circuit substrates and having a rotatable chip engaging member, the improvement comprising:
- means to drivingly rotate said chip engaging member,
- means for bringing said member into mutual engagement successively with each of a run of said chips,
- adjustable program means for initialy setting up the machine to predetermine for an entire run of chips the selection as a home orientation any one of a predetermined set of orientations,
- and automatically repetitive means responsive to said program means to rotate said member automatically through a sequence of angular displacements each occurring after engagement by said member with one of said run of chips and each displacement of a magnitude to rotate the respective chip to said selected home orientation.

6. In a chip positioning machine for assembling semiconductor chips to printed-circuit substrates and having vacuum needle means adapted to pick up a chip and to place said chip upon said substrate, means for sensing the initial orientation of said chip on said needle means, and a rotatable chip engaging member, the improvement comprising:
- means to drivingly rotate said chip engaging member,
- means responsive to said sensing means to rotate said member to an orientation corresponding to said initial orientation of the chip,
- means for bringing said member and said chip into mutual engagement,
- program means for selecting a home orientation,
- and means to rotate said member together with the chip engaged thereby to said selected home orientation.

7. In a chip positioning machine for assembling semiconductor chips to printed-circuit substrates and having vacuum needle means adapted to pick up a chip and to place said chip upon said substrate, means for sensing the initial orientation of said chip on said needle means, and a rotatable chip engaging member, the improvement comprising:
- stepping motor means to drivingly rotate said chip engaging member,
- electrical circuit means responsive to said sensing means for energizing said motor to rotate said member to an orientation corresponding to said initial orientation of the chip,
- means for bringing said member and said chip into mutual engagement,
- program means for selecting a home orientation,
- and electrical circuit means for energizing said motor to rotate said member together with the chip engaged thereby to said selected home orientation.

8. In a workpiece positioning machine having holding means adapted to pick up a workpiece and to place the latter, means for sensing the initial orientation of said workpiece on said holding means, and a rotatable workpiece engaging member, the improvement comprising:
- driving means to rotate said workpiece engaging member,
- means responsive to said sensing means for actuating said driving means to rotate said member to an orientation corresponding to said initial orientation of the workpiece,
- means for bringing said member and said workpiece into mutual engagement,
- adjustable program means for selecting as a home orientation any one of a predetermined set of orientations,
- and means for actuating said driving means to rotate said member together with the workpiece engaged thereby to said selected home orientation.

9. A workpiece positioning machine comprising:
- a rotatable workpiece engaging member,
- stepping motor means to drivingly rotate said workpiece engaging member and having a series of mutually angularly displaced windings,
- means for bringing said member and a workpiece into mutual engagement,
- adjustable program means for selecting as a home orientation any one of a predetermined set of orientations, and
- electrical circuit means for energizing said motor windings sequentially to rotate said member together with the workpiece engaged thereby to said selected home orientation.

10. In a workpiece positioning machine having holding means adapted to pick up a workpiece and to place said workpiece upon an assembly, means for sensing the initial orientation of said workpiece on said holding means, and a rotatable workpiece engaging member, the improvement comprising:

stepping motor means to drivingly rotate said workpiece engaging member, electrical circuit means responsive to said sensing means for energizing said motor to rotate said member to an orientation corresponding to said initial orientation of the workpiece, means for bringing said member and said workpiece into mutual engagement, and electrical circuit means for energizing said motor to rotate said member together with the workpiece engaged thereby to a predetermined home orientation while the workpiece is held on said holding means.

11. In a workpiece positioning machine having means for sensing the initial orientation of said workpiece, and a rotatable workpiece engaging member, the improvement comprising:

driving means to rotate said workpiece engaging member, electrical circuit means responsive to said sensing means for energizing said motor to rotate said member to an orientation corresponding to said initial orientation of the workpiece, means for bringing said member and said workpiece into mutual engagement, and electrical circuit means for energizing said driving means to rotate said member together with the workpiece engaged thereby to a predetermined home orientation.

12. In a workpiece positioning machine having means for sensing the initial orientation of the workpiece, and a rotatable workpiece engaging member, the improvement comprising:

stepping motor means to drivingly rotate said engaging member and having a series of mutually angularly displaced windings, electrical circuit means responsive to said sensing means for energizing said motor windings sequentially to rotate said member to an orientation corresponding to said initial orientation of the workpiece, means to bring said member and said workpiece into mutual engagement, and electrical circuit means for energizing said motor windings sequentially to rotate said member together with the workpiece to a predetermined home orientation.

13. A chip positioning machine for assembling semiconductor chips to printed-circuit substrates and comprising:

holding means adapted to pick up a chip by engaging one surface thereof and to place said chip upon a substrate, a rotatable chip engaging member, means to drivingly rotate said chip engaging member, means for bringing said member and a chip into mutual engagement at another surface of said chip, adjustable program means for selecting as a home orientation any one of a predetermined set of orientations, and means to rotate said member together with the chip engaged thereby to said selected home orientation while the chip is held on said holding means.

14. A chip positioning machine comprising:

means for sensing the initial orientation of a chip, a rotatable chip engaging member, means responsive to said sensing means to displace said member to an orientation corresponding to said initial orientation of the chip, means for bringing said member and said chip into mutual engagement, and means to further displace said member together with the chip engaged thereby to a predetermined home orientation.

15. A chip positioning machine comprising:

vacuum needle means adapted to pick up a chip and to place said chip upon a substrate, means for sensing the initial orientation of said chip on said needle means, a rotatable chip engaging member, stepping motor means to drivingly rotate said chip engaging member, electrical circuit means responsive to said sensing means for energizing said motor to rotate said member to an orientation corresponding to said initial orientation of the chip, means for bringing said member and said chip into mutual engagement, program means for selecting a home orientation, and electrical circuit means for energizing said motor to rotate said member together with the chip engaged thereby to said selected home orientation.

16. A workpiece positioning machine comprising:

holding means adapted to pick up a workpiece and to place the latter, means for sensing the initial orientation of said workpiece on said holding means, a workpiece engaging member, driving means to displace said workpiece engaging member, means responsive to said sensing means for actuating said driving means to displace said member to an orientation corresponding to said initial orientation of the workpiece, means for bringing said member and said workpiece into mutual engagement, adjustable program means for selecting as a home orientation any one of a predetermined set of orientations, and means for actuating said driving means to further displace said member together with the workpiece engaged thereby to said selected home orientation.

17. A workpiece positioning machine comprising:

a workpiece engaging member, driving means to displace said workpiece engaging member, means for bringing said member into mutual engagement successively with each of a run of said workpieces, adjustable program means for initially setting up the machine to predetermine for an entire run of workpieces the selection as a home orientation any one of a predetermined set of orientations, and automatically repetitive means responsive to said program means to rotate said member automatically through a sequence of angular displacements each occurring after engagement by said member with one of said run of workpieces and each displacement of a magnitude to rotate the respective workpiece to said selected home orientation.

References Cited

UNITED STATES PATENTS 3,198,311 8/1965 Lajoie _____ 198—33
3,240,332 3/1966 Grunwald _____ 198—33

EVON C. BLUNK, *Primary Examiner.*

E. A. SROKA, *Assistant Examiner.*